United States Patent [19]

Shar et al.

[11] Patent Number: 4,758,946
[45] Date of Patent: Jul. 19, 1988

[54] PAGE MAPPING SYSTEM

[75] Inventors: Len Shar, Palo Alto; Balasubramanian Kumar, San Jose, both of Calif.

[73] Assignee: Elxsi, San Jose, Calif.

[21] Appl. No.: 912,218

[22] Filed: Sep. 26, 1986

Related U.S. Application Data

[63] Continuation of Ser. No. 850,087, Apr. 9, 1986, abandoned, which is a continuation of Ser. No. 382,897, May 28, 1982, abandoned.

[51] Int. Cl.⁴ ............................................. G06F 12/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 4,136,385 | 1/1979 | Gannon et al. | 364/200 |
| 4,155,119 | 5/1979 | DeWard et al. | 364/200 |
| 4,186,438 | 1/1980 | Benson et al. | 364/200 |
| 4,253,145 | 2/1981 | Goldberg | 364/200 |

OTHER PUBLICATIONS

"The Multics Virtual Memory: Concepts and Design" written by Clinger and Daley, Comm. of the ACM, May 1972, vol. 15, #5, pp. 308-318.

Primary Examiner—Eddie P. Chan
Attorney, Agent, or Firm—Townsend and Townsend

[57] ABSTRACT

A page mapping system for virtual memory that requires only one address to be continually resident in memory per user subspace and permits the size of a process subspace to be varied dynamically. The system provides a tree of page map pages ("PM pages") with only the very root of the tree (a base address entry) being required to be in physical memory. Depending on the size of the space, the page map includes, as well as the base address entry, a number of paged levels with one PM page at the highest level (to which PM page the base address entry points). The page map entries (PMEs) of the first level PM pages point directly to the physical pages. Each PME in a higher level of the page map points to a PM page at a lower level in the page map, whereupon the page map may grow geometrically from the highest level to the first level. The PMEs for pages or PM pages that are not allocated are so marked. The number of levels of the page map is dynamic, and may be increased should the subspace need to be increased to a size that exceeds the maximum size that can be mapped by the page map of a present number of levels. The page map includes within it a representation of the number of levels.

10 Claims, 6 Drawing Sheets

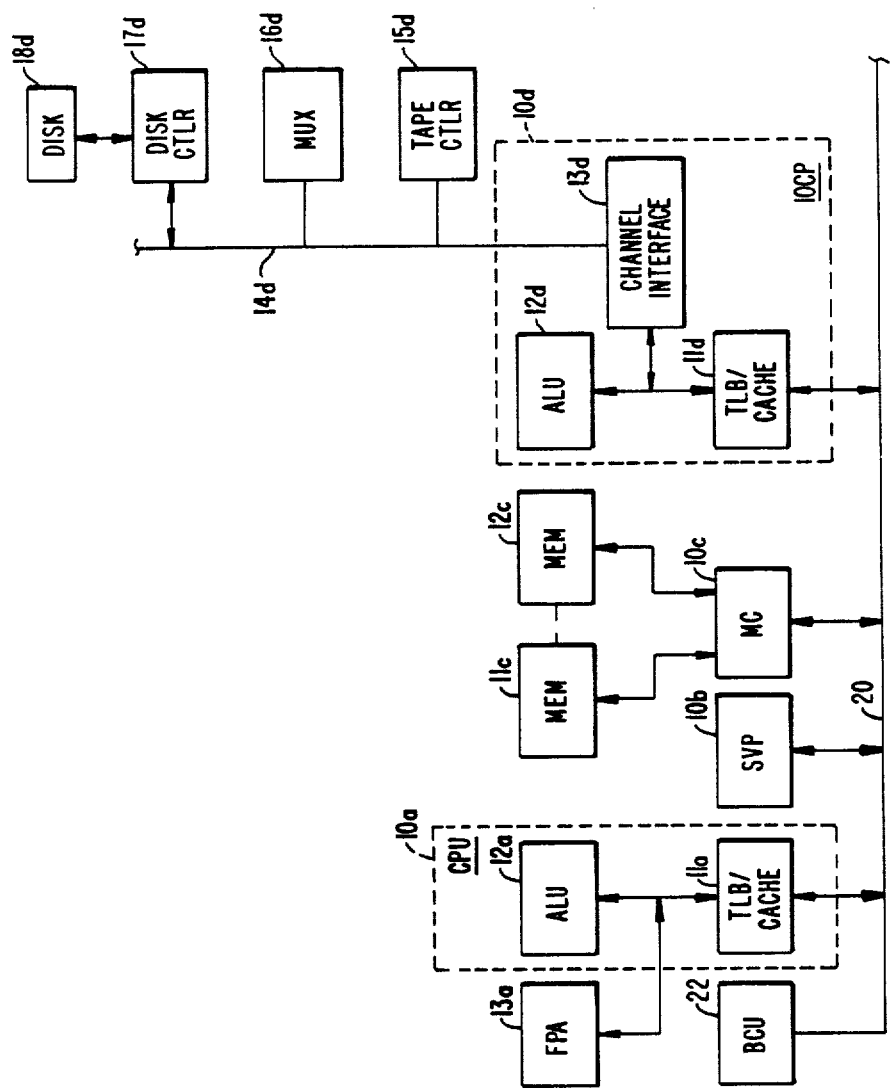
FIG._1.

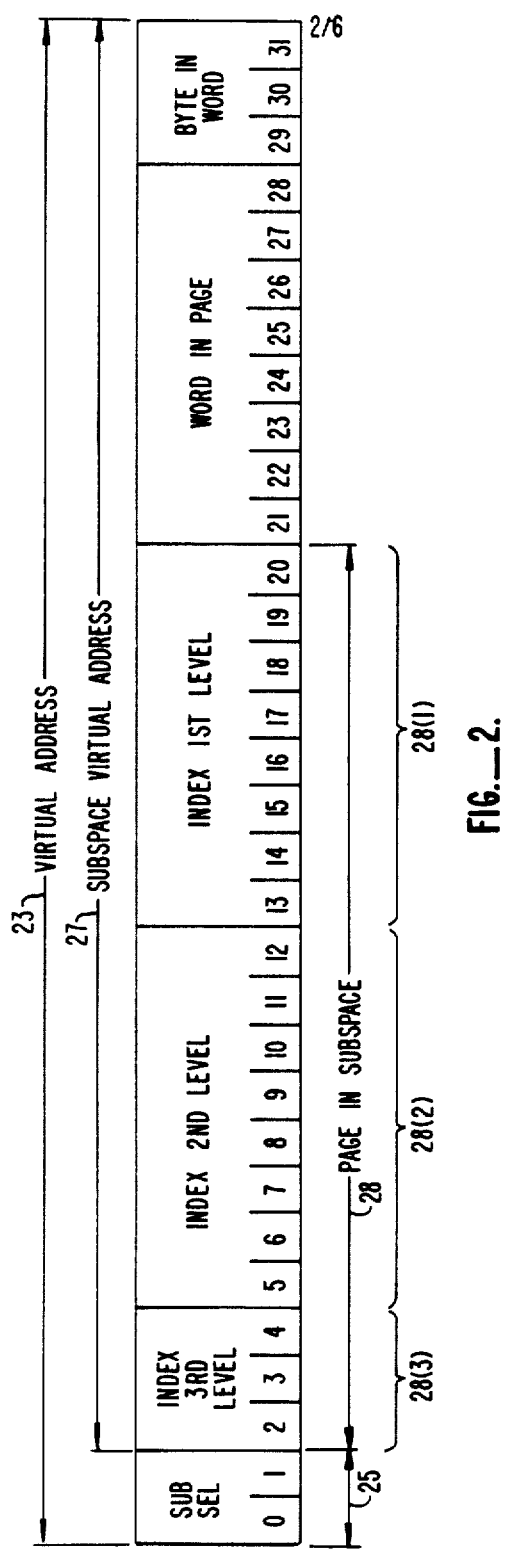
FIG._2.

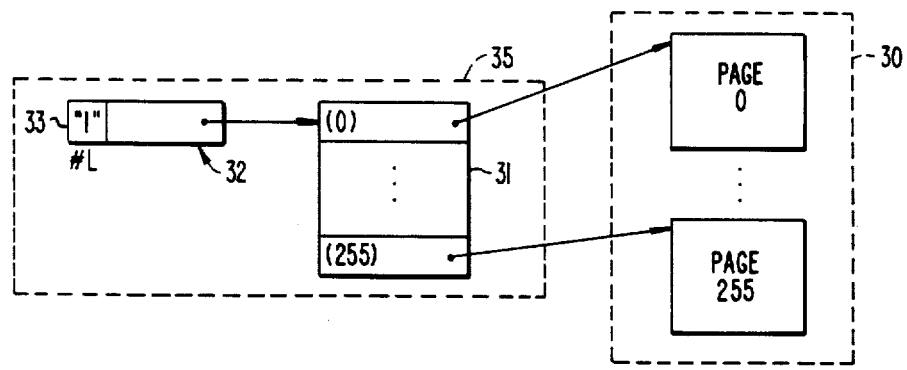
FIG._3A.
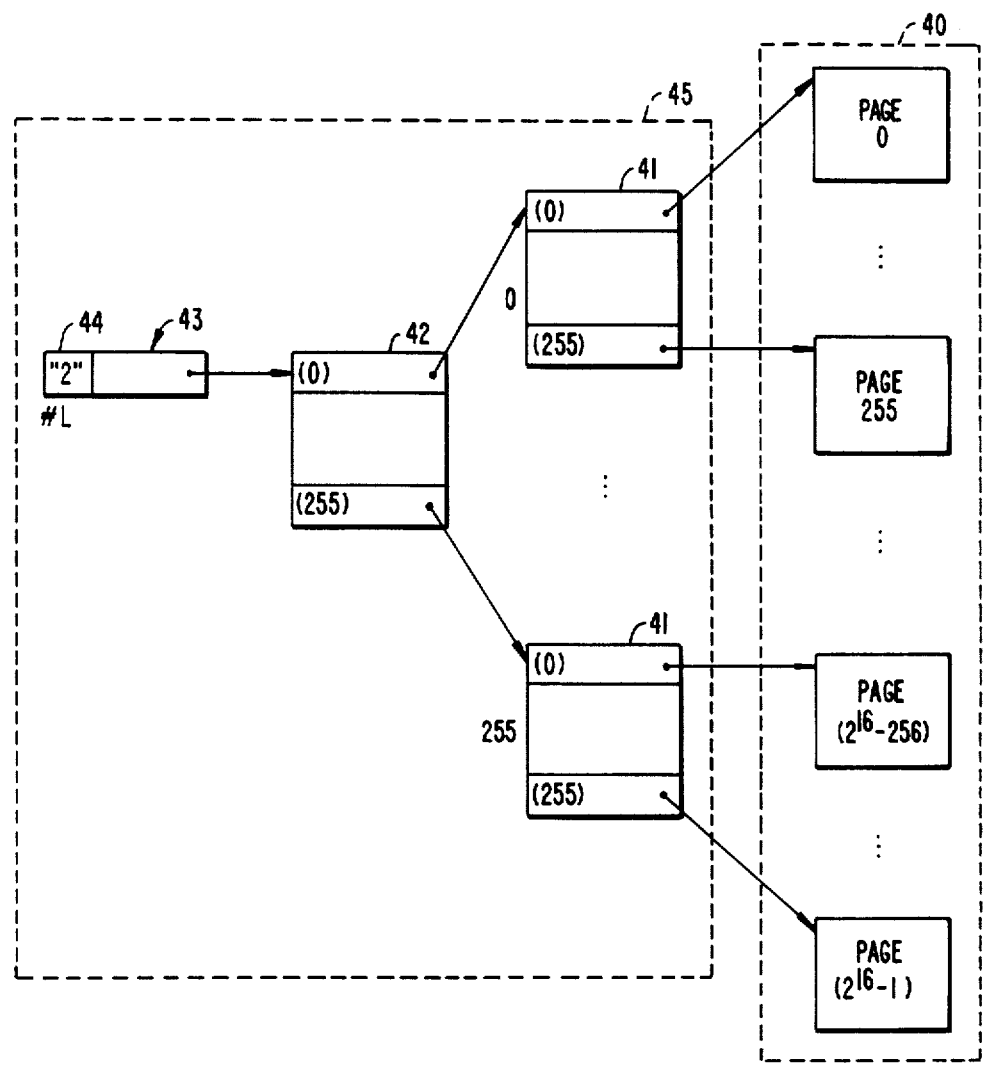
FIG._3B.

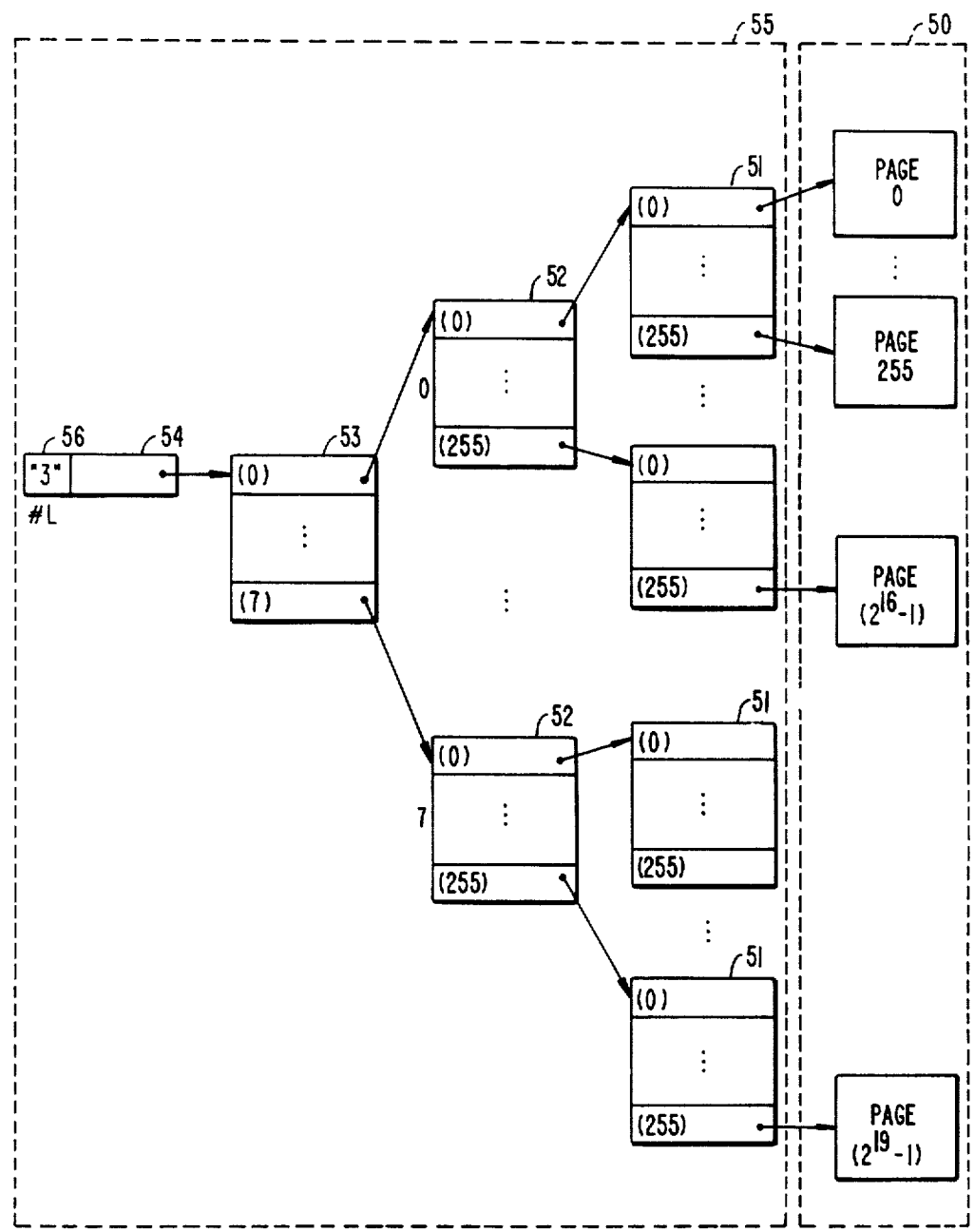
FIG._3C.

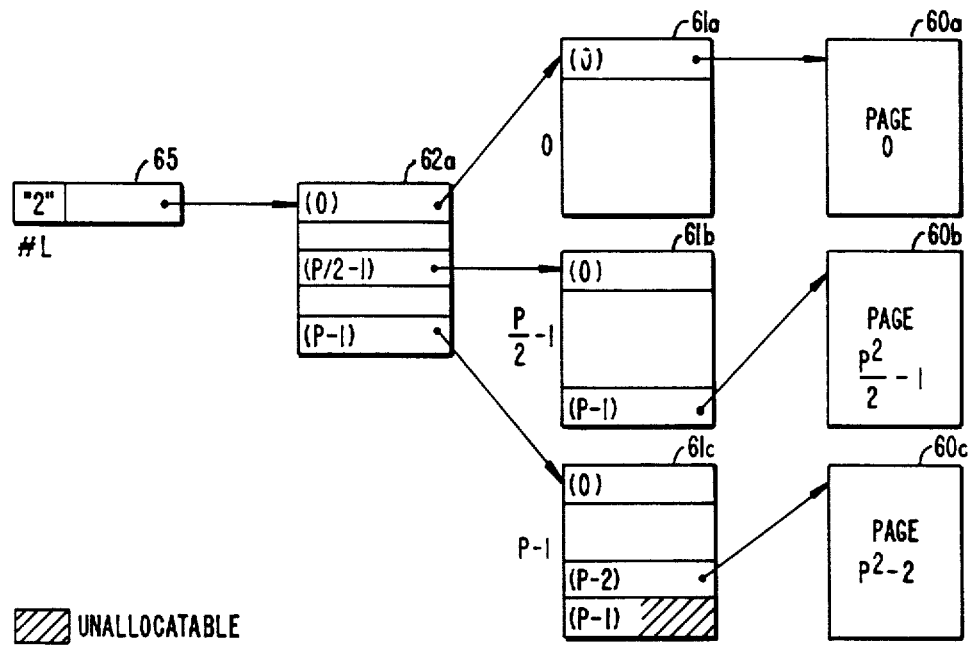
FIG._4A.
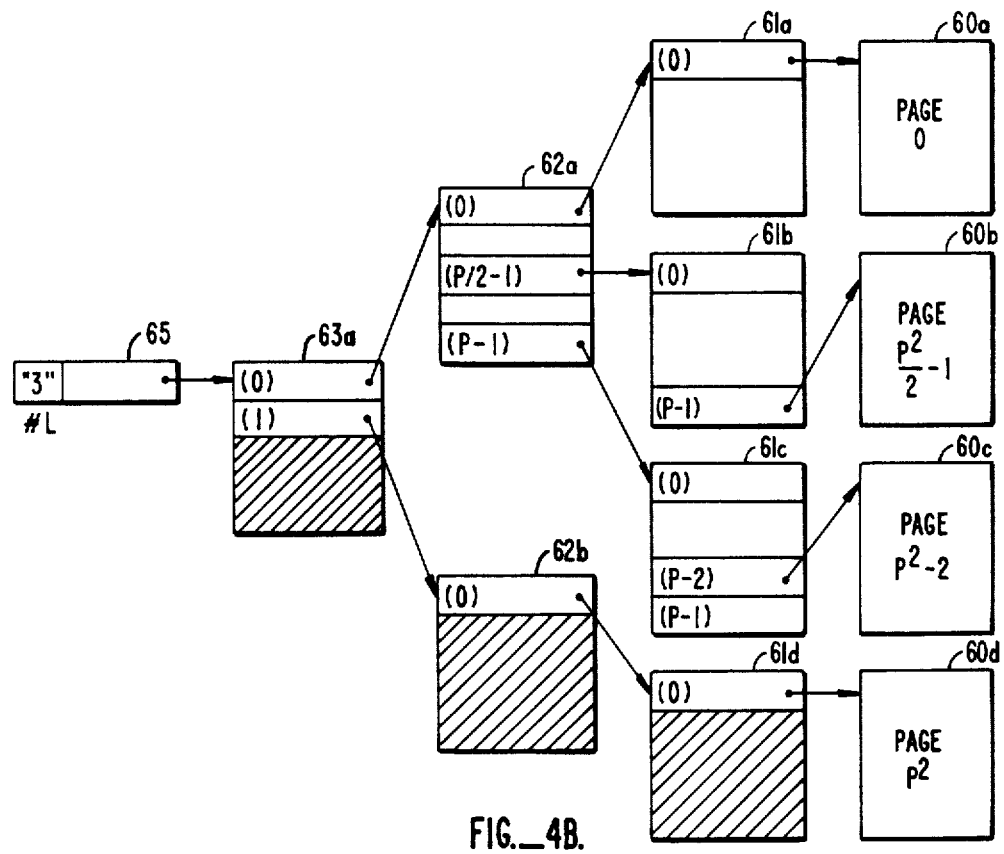
FIG._4B.

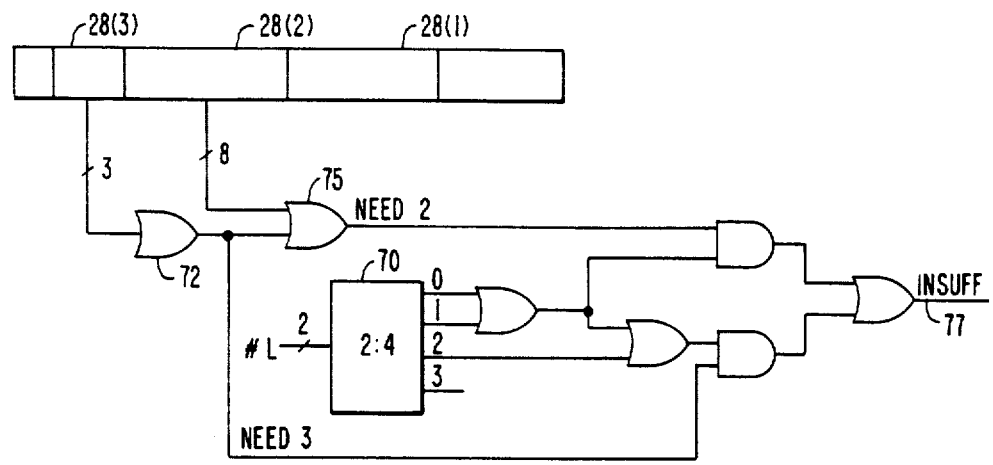
FIG._5A.
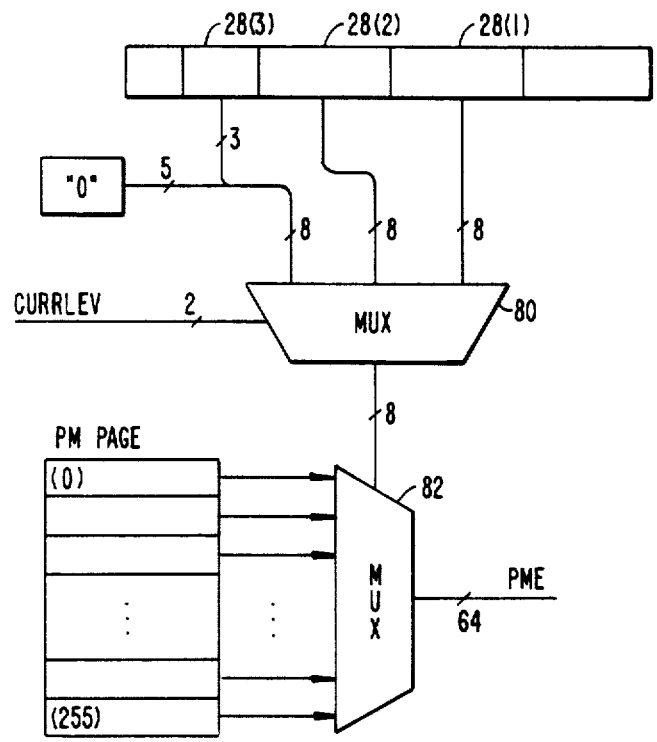
FIG._5B.

PAGE MAPPING SYSTEM

This is a continuation of application Ser. No. 850,087, filed Apr. 9, 1986, now abandoned which is a continuation of Ser. No. 382,897, filed May 28, 1982, now abandoned.

FIELD OF THE INVENTION

The present invention relates generally to data processing systems, and more specifically to systems for translating virtual addresses into physical addresses.

BACKGROUND OF THE INVENTION

Optimization of data access typically entails an effort to move data and instructions among the various types of memory in order to best match the capabilities of the devices requiring the data. A typical computer system might be viewed as having three types of memory, namely high speed memory, random access memory (RAM), and mass memory. The high speed memory may consist of a small number of data registers or a larger number of registers forming a scratch pad memory. The random access memory typically consists of large arrays of solid state memory cells implemented as large scale integrated circuits. Mass memories may include semirandom access memories such as magnetic disks or sequential memories such as magnetic tape. These three types of memories, as listed above, may be considered to form a hierarchy, with the capacity increasing and the speed and cost decreasing as one goes down the list.

The remaining portions of this application will be concerned with the manner in which information is communicated between the random access memory (which will sometimes be referred to as "physical memory," "real memory," or simply "memory") and disk space In order for a central processing unit to read or write an item of data, such item of data must reside in physical memory. Thus, if the size of a program exceeds the capacity of the RAM, provision must be made to swap portions of the program between the RAM and the disk. In order to relieve the programmer of this responsibility, an organizational technique known as "virtual memory" is used to increase the apparent size of the RAM. This illusion of a larger RAM is implemented by modifications that permit the operating system to replace unused blocks of words in the RAM with relevant blocks of words from the disk as the user addresses data that is not in physical memory.

Every virtual memory computer system has to provide some mechanism to translate a "virtual address" into a "physical address" that can be used to access memory. This is usually done by dividing the virtual addressing space into chunks and providing a translation or mapping system between an address designating a particular chunk in the virtual address space and the address of the corresponding chunk in physical memory. Where such chunks are of fixed size, they are typically referred to as "pages" which will be the term used in the remainder of this application.

For each page that can be addressed in the virtual space, there must exist a page descriptor which describes the state of that page in reality. The page may or may not reside in physical memory at any instant. If the page is in memory, the descriptor will indicate that fact and will indicate the location of the page in physical memory. If the page is not in physical memory, but is on disk, the descriptor will indicate that fact and will contain enough information for the system to access the page. The collection of all the page descriptors for a virtually addressable space is called a page map, and since each of the descriptors is an entry in this map, the page descriptors are referred to as the page map entries (PMEs).

The simplest page mapping system would be a linear array of PMEs stored in physical memory with the page number being used to index into the array. This mechanism is suitable for computers with only one virtual space, and a small one at that. However, if the virtual space becomes large, the page map itself becomes large, and consumes a large amount of physical memory. Moreover, in modern computer systems, protection of users (processes) is often provided by giving each process its own virtual space which may include one or more virtual subspaces.

These considerations have made it necessary to invent mechanisms whereby the individual page maps for the different processes need not all reside in physical memory at the same time. Thus, some systems allow the page map for each process to be swapped in when that process runs and swapped out again when it is not executing. However, this involves considerable overhead when switching between processes, and therefore the mechanism is not widely used in systems where processes are given large subspaces (which have large page maps).

A better and more widely used scheme requires that only parts of the page map be in physical memory at all times. The most common method, one used by the Digital Equipment Corporation (DEC) architecture, essentially places the process page map itself in a virtual space (in the case of VAX this is the operating system's virtual space). The page map for the system space has to be resident in memory, so that as the number of processes grows and the size of each of their spaces grows, the total size of user program page maps gets large. This makes the system virtual space large in turn makes the page map for the system large, thereby using up a large amount of physical memory. For example, VAX claims that a user can virtually address up to 2 Gigabytes (4M 512-byte pages). Such a page map would require 16 Megabytes, (32K pages) of system virtual space which requires 128 Kilobytes of physical memory to store the page system map. Thus, each process having 2 Gigabytes of virtual address space would use 128 Kilobytes of physical memory which would be unavailable for other uses.

A general problem with any virtual addressing system is to make sure that a process does not accidentally access a page that is outside that process' space. This requires a bounds check to verify that the address is within the permissible range. The VAX system described above handles the problem by requiring all processes to have the same maximum size space. The fixed size is a configuration parameter that is defined at the time the operating system is initialized. However, this size must be kept small to conserve real memory space.

Another feature of the above virtual addressing system is that the translation from virtual address of a byte to physical address of a byte always requires two accesses to memory, the first to find the location of the page map in physical memory and the second to find the location of the byte from the appropriate page map entry.

SUMMARY OF THE INVENTION

The present invention provides a page mapping system that requires only. one address to be continually resident in memory per user subspace, minimizes the number of memory accesses required commensurate with the size of the subspace to be mapped, and permits the size of a process subspace to be varied dynamically.

Broadly, these advantages are achieved by providing a tree of page map pages (hereinafter "PM pages") with only the very root of the tree (a base address entry) being required to be in physical memory. Depending on the size of the space, the page map includes, as well as the base address entry, a number of paged levels with one PM page at the highest level (to which PM page the base address entry points). The page map entries (PMEs) of the first lowest level PM pages point directly to the physical pages. If a page is allocated, the PME defines whether the page is in memory. If so, the PME specifies the physical address of the page image in physical memory, if not, the PME specifies the disk address of the page. Each PME in a higher level of the page map points to a PM page at a lower level in the page map, whereupon the page map may grow geometrically from the highest level to the first level. The PMEs for pages or PM pages that are not allocated are so marked. Additionally, PMEs that would point to a page or PM page outside an administrative range are marked unallocatable.

The number of levels need only be as big as is required to span a given sized virtual subspace. However, the number of levels of the page map is dynamic, and may be increased should the subspace need to be increased to a size that exceeds the maximum size that can be mapped by the page map of a present number of levels. The page map includes within it a representation of a number of levels, so that the translation from virtual address to physical address can occur with the correct number of levels of indirection. This representation may be a level descriptor stored in association with the base address entry, or it may include flags in the PMEs indicative of whether a PME is at the last level (in which case it points to the physical page) or whether it is at a higher level (in which case it points to a PM page of PMEs at a lower level).

Thus, small subspaces have a one-level page map which fits into one PM page. Such a small subspace cannot exceed P pages where P is the number of PMEs that may fit in a PM page. Larger subspaces have a two-level page map, with the first level having up to P PM pages and the second level having a single PM page. Such a subspace cannot exceed $P^2$ pages. Even larger subspaces (up to $P^3$ pages) have a three-level page map with the expansion handled in a similar fashion.

The organizational similarity of the various sizes of subspace makes it easy to expand a subspace even if it crosses one of the boundaries separating the categories. Consider, for example, a situation where a process needs to have a single page added to a $P^2$-page subspace. Assuming that no administrative size limits are exceeded by such an addition, the memory manager will augment the page map by adding a PM page to each of the first two levels and creating a third level by adding a PM page. The base address entry is changed to point to the newly added third-level PM page, and the level descriptor (if explicitly present) is incremented. The first PME of the new third-level PM page points to the previous (first) second-level PM page and the second PME points to the newly added (second) second-level PM page. The first PME of the newly added second-level PM page points to the newly added first-level PM page. The first PME of the newly added first-level PM page points to the newly added page.

It will be appreciated that the present invention is efficient from the point of view of memory utilization since it only requires one physical memory location (for the base address entry). Moreover, given that most subspaces are relatively small, the present invention is efficient from a memory access point of view since there are no unnecessary levels of indirection. For example, most subspaces are small enough to fit within the limit imposed by a one-level page map.

The present invention allows virtual spaces having a variety of sizes to coexist within the system. This allows a variety of processes to be running with each process optimized from a memory access point of view. At the same time, the need for a bounds check to prevent access out of bounds is avoided. An attempt to access a page beyond the virtual subspace boundary results either in accessing a PME marked unallocatable or in an improper correlation between the level descriptor and the address.

The PM pages need only be allocated to the extent that physical pages within the subspace are allocated. The size of the subspace (and required number of page map levels) will be determined by the number of pages from one edge of the subspace to the page furthest from that edge, even for an extreme case where the page furthest from the edge is the only allocated page.

For a further understanding of the nature and advantages of the present invention, reference should be made to the remaining portion of the specification and the attached drawings.

BRIEF DESCRIPTION OF THE DRAWINGS

FIG. 1 is a block diagram of a computer system which may utilize the page mapping system of the present invention;

FIG. 2 illustrates the various fields within a virtual address;

FIGS. 3A-C illustrate respective page map data structures having one, two, and three levels, respectively;

FIGS. 4A-B illustrate the page map data structures that are generated during allocation and expansion of the virtual space; and FIGS. 5A-B are logical schematics of circuitry for testing and decoding the virtual address.

DESCRIPTION OF THE PREFERRED EMBODIMENT

FIG. 1 is a block diagram of a particular computer system on which the present invention may be implemented. Broadly, the computer system comprises a central processing unit (CPU) 10a, a service processor (SVP) 10b, a memory controller (MC) 10c and an I/O channel processor (IOCP) 10d, all of which communicate on a system bus 20 with bus arbitration being carried out by a bus control unit (BCU) 22. CPU 10a includes a cache/TLB (translation lookaside buffer) 11a and an arithmetic logical unit (ALU) 12a and further communicates with a floating point accelerator (FPA) 13a. Service processor 10b is used for initialization and reconfiguration of the computer system. Memory controller 10c communicates with memory units 11c and 12c. I/O channel processor 10d includes a cache/TLB 11b, an ALU 12b, and a channel interface 13d. Channel interface 13d communicates via a separate bus 14d with a plurality of peripheral units which may include a tape controller 15d, an asynchronous multiplexer 16D and a disk controller 17d. Disk controller 17d communicates with a disk drive 18d.

The present invention relates to the manner in which data on disk 18d or in one of memory units 11c or 12c is made available to CPU 10a. It is to be understood that the illustrative system configuration is for a small system, and that a more elaborate system would contain multiple CPU's, memory controllers, and I/O channel processors. Moreover, while the discussion that follows refers to various numerical ranges and capacities, the particular numerical parameters are disclosed for illustrative purposes only, and the present invention does not depend on such implementation details. Capacities will be described in terms of Kilobytes, Megabytes, and Gigabytes where:

1 Kilobyte = $2^{10}$ or 1024 bytes
1 Megabyte = $2^{20}$ or 1,048,576 bytes
1 Gigabyte = $2^{30}$ or 1,073,741,824 bytes Generally, data, whether on disk or in memory, is organized by pages, where a page includes 2 Kilobytes or 256 8-byte words. A typical capacity for each of memory units 11c and 12c is 8 Megabytes (4K pages). By way of contrast, a single disk unit may contain 600 Megabytes (300K pages).

It would be possible to address any given byte location within the illustrative 16 Megabytes of memory by a 24-bit address. However, it is desirable to provide each process with an illusion of much greater memory, as for example one or more subspaces addressable by a 30-bit virtual address. FIG. 2 shows the bit allocation for a 32-bit virtual address field 23 wherein bits 0–1 provide a subspace selection field 25 and bits 2–31 provide a virtual address field 27 within a designated subspace. Bits 2–20 of subspace address field 27 define a page designator field 28 which may be broken down into a first-level index 28(1) (bits 13–20), a second-level index 28(2) (bits 5–12), and a third-level index 28(3) (bits 2–4). Therefore, each virtual subspace could have 1 Gigabyte (512K pages). It is immediately apparent that this virtual subspace far exceeds the physical memory capacity of any reasonably feasible computer system, and when it is considered that a multi-user environment will typically have several processes executing, a system would require many such subspaces.

The actual organization of the virtual space is that it is divided into four equal subspaces, of 1 Gigabyte each. The first subspace, called P0 (with field 25=00), grows with increasing addresses starting from 0. The second subspace, called P1 (with field 25=01) grows by decreasing addresses starting from address 7FFFFFFF (Hex). The public subspace, called PUB, (with field 25=10), is shared among all processes and is used primarily for system library code. PUB grows with increasing addresses starting at 80000000 (Hex). The last subspace (field 25=11) is not used in the present architecture. The discussion that follows will be in terms of the P0 subspace.

In order to permit the virtual addressing of such large subspaces while keeping actual memory requirement low, there is provided a page mapping data structure and system, to be described below, which is used to translate a virtual address to a physical address. For every virtual page in a subspace, there may be a physical page allocated to it by the memory manager. If the page is allocated to the subspace, there exists a page on the disk which contains the data of the allocated page. At any given moment, the page may be "in memory," in which case the most current version of the data is in real memory. The instruction set can only reference the data if it is "in memory" at that instant. Thus, if a page is not in memory when the CPU needs to access it, a "page fault" occurs and the memory manager is invoked to bring the page from disk into memory so that the CPU can continue executing for the faulting process.

FIG. 3A illustrates in schematic form a one-level page map to accomplish the above. More particularly, a virtual subspace 30 is mapped by a page map 35 which includes a single page map page (hereinafter PM page) 31 and a base address register 32. Base address register 32 includes, among other things, a pointer to PM page 31. PM page 31 has space for 256 8-byte page map entries (PMEs).

Each PME in PM page 31 corresponds to one of the pages in virtual subspace 30, and includes the physical address of the physical page allocated to that virtual page in the subspace, assuming that a physical page was allocated. Thus, virtual subspace 30 may have a maximum of 256 pages (512 Kilobytes) allocated to it, subject to administrative limits. If a physical page was not allocated, the PME contains an appropriate flag indicating whether that page may be permissibly allocated. For example, if the maximum permissible allocation to the virtual subspace was only 100 pages, the first 100 PMEs in PM page 31 would have appropriate physical address pointers or would indicate that the particular page could be allocated if required, while the last 156 PMEs would signify that the corresponding pages were unallocatable. A more complete description of the PME formats may be found in Appendix 1.

Page map 35 also includes within it a representation that the page map has one paged level. This is preferably included as a level descriptor 33 (#L) stored in association with the pointer in base address register 32. Alternately, this information could be provided by having a flag in each PME, with the first-level PMEs having the flag set one way and the higher-level PMEs having it set the other.

Consider next the data structure shown in FIG. 3B wherein a virtual subspace 40 is mapped by a two-level page map 45 which includes a plurality of first-level PM pages 41, a single second-level PM page 42, and a base address register 43. As in the case of the single level page map, first level PM pages 41 include PMEs pointing to the physical pages, while each of PM pages 41 is itself pointed to by a corresponding PME in second-level PM page 42. Base address register 43 includes a pointer to second-level PM page 42 and also includes a level descripter 44 indicative of two paged levels. Using such a two-level page map, given that there are up to 256 first level PM pages 41, it is possible to virtually address (256)(256) = 64K pages (128 Megabytes).

FIG. 3C shows a data structure in which a virtual subspace 50 is mapped by a three-level page map 55 which includes a plurality of first-level PM pages 51, a plurality of second level PM pages 52, a single third level PM page 53, and a base address register 54. Base address register 54 includes a level descriptor 56 indicative of three paged levels. Commensurate with the 19-bit page field in the virtual address, third-level PM page 53 is shown as having only 8 entries. Accordingly, page map 55 can map onto a virtual subspace having up to (8)(256)(256)=512K pages (1 Gigabyte).

In all the above cases, the base address register must be in real memory, while the PM pages will reside on disk most of the time. It should be noted that the PM pages are not part of the virtual subspace, but typically part of the memory manager's virtual space.

For the sake of generality, it will be assumed that each PM page has space for P PMEs, (P=256 for the illustrative embodiment) and that the virtual space spans V pages. The number of levels will be denoted by L. Therefore, a one-level page map as shown in FIG. 3A can span a virtual subspace for $V \leq P$; a two-level page map as shown in FIG. 3B can span a virtual subspace for $V \leq P_2$; and a three-level page map can span a virtual subspace $V \leq P^3$. For the special case noted above, an overriding limit on the virtual subspace, namely the limitation of the total number of bits in the address field, imposed an upper limit on V that was less than $P^3$. A larger address field would have permitted a larger virtual subspace, possibly also requiring an increase in the maximum number of levels. However, the particular embodiment described above shows that even three levels for the particular page sizes is more than adequate for the largest subspace one is likely to encounter in practice.

At this point, the distinction between the virtual subspace size and the number of pages allocated to the subspace should be emphasized. The actual number of PM pages allocated to the page map need only be as large as necessary to contain the PMEs that point to the allocated data pages. For example, if a contiguous block of NA virtual pages has physical pages allocated thereto, this will require [(NA−1)/P+1] (or possibly [(NA−1)/P+2]) first-level PM pages. In this context, [...] denotes the greatest integer function (for example, [1.5]=1, [1.99]=1, 2.0]=2). To make the discussion above more definite, a number of specific situations will be assumed.

First, assume that the initial administrative limit restricts the subspace to $(P^2-1)$ pages in size. Therefore, as discussed above, a two-level page map will ultimately be required to adequately map this subspace. In principle, prior to the allocation of any disk pages to the subspace, the base address register will indicate that the PM page to which it points is unallocated. The level descriptor will nevertheless indicate a two-level page map. In practice, at least one page will always be allocated to the subspace, so the base address register will not indicate unallocated.

Now, assume that it is desired to allocate page(0), page(P/2−1), and page(P²−2). The discussion that follows will utilize a subscripting system which starts at 0. Thus, the first PME in a PM page will be designated PME(0), the last PME will be designated PME(P-1), and so on. Similarly, page(P²−2) refers to the (P²−1)-th page. FIG. 4A shows the totality of page map entries and PM pages that will have been allocated both to the virtual subspace and to the page map. The three data pages are designated 60a−c. In all, at this point, the page map includes three first-level PM pages 61a−c, and a single second-level PM page 62a, and a base address register 65. PME(0) of page 61a points to page 60a, PME (P-1) of PM page 61b to page 60b, PME(P-2) of PM page 61c points to page PME(P-1) of PM page 61c (which would point to page(P²−1) indicates unallocatable, since the maximum subspace size is (P²−1).

PMEs that may not have physical pages allocated (that is, indicating unallocatable) are shown as cross-hatched. The remaining PMEs of PM pages 61a, 61b, and 61c show the corresponding pages not to have been allocated, but that the pages may be permissibly allocated since they are within the maximum subspace size.

Assume now that it is desired to expand the subspace to a size P². Again, this may be accomplished within the confines of the two-level page map, and the subspace expansion is effected by changing the flag in the PME(P−1) of PM page 61c to indicate that the page may be permissibly allocated. Should page(P²−1) be allocated, PME(P−1) of PM page 61c would then point to the allocated page. Referring to FIG. 4B, assume now that the administrative limit of this subspace is to be expanded to a size (P²+1). Further assume that page(P²), designated 60d, is the only new page that is actually allocated to this subspace. Upon the expansion of the subspace, but prior to the allocation of page(P²), the page map is augmented by the addition of a third-level PM page 63a, PME(0) of which points to second-level PM page 62a, PME(1) of which indicates unallocated but allocatable and the remaining PMEs of which indicate unallocatable. PM page 63a is pointed to by base address entry 65. Upon allocation of page(P²) the page map is further augmented by the addition of a fourth first-level PM page 61d and a second second-level PM page 62b. PME(0) of PM page 61d points to page (P²), PME(0) of PM page 62b points to PM page 61d, and PME(1) of PM page 63a points to PM page 62b. The remaining PMEs of PM pages 61d and 62b indicate unallocatable.

Thus, it may be seen that subspace size may be increased across page map level boundaries in a manner that leaves the previously existing page map structure unaffected except for the base register contents.

The above description assumed that the number of levels in the page map is initially determined by the administrative limit on the subspace size. However, it is equally appropriate to start out with only the number of levels needed to map the allocated pages. Thus, in the example of FIG. 4B, if at a certain point page(0) were the only page allocated, the page map would not need two levels until such time as page(P²/2−1)or page (P²−2). The administrative limit would be used to determine whether or not pages could be allocated, but the number of page map levels would be determined by the particular allocated pages.

FIGS. 5A−B are logical schematics of circuitry suitable for translating a virtual address into a physical address. It should be realized that while the use of hard-wired logic components as shown would provide the maximum speed, it is typically advantageous to implement this circuitry in microcode. The reason for this is that extreme speed is usually not necessary since the accessing will be limited by the time required for accessing the PMEs from memory. It is still useful to discuss the circuitry for an understanding of how the virtual address field depicted in FIG. 2 correlates with the page maps of FIGS. 3A−C.

FIG. 5A is a circuit schematic illustrating the manner in which it is determined whether the number of levels specified by the level descriptor (33, 44, 56) is sufficient for the virtual address. The two bits for the level descriptor are communicated to a 2:4 decoder 70, the four output lines of which are such that one and only one line will have an active level representing the number of levels. The three bits of third-level index field 28(3) are communicated to an OR gate 72, the output of which is designated NEED3 and indicates that a three-level map is needed. The NEED3 signal is communicated along with the eight bits of the second level index field 28(2) to an OR gate 75, the output of which is designated NEED2 and indicates that at least two levels are needed in the page map. The output lines from decoder 70 are compared with the NEED2 and NEED3 signals to determine whether the number of levels is sufficient, and an error signal, designated INSUFF is generated on a line 77.

While the logic diagram of FIG. 5A is appropriate for the P0 subspace, it will be apparent that P1 requires inverted logic for the NEED2 and NEED3 signals. More particularly, while it is the presence of a 1 in the second-level and third-level level indices that signifies the need for the higher number of levels for P0, it is the presence of a 0 that would so signify for P1.

The accessing of a page of data occurs by repeated accesses to the PM pages, with the pointer that is generated at the lowest level pointing to the actual data page. Accordingly, in order that the right number of levels of indirection be utilized, a register, designated CURRLEV, representative of the current level on which the page is being indexed must be used. CURRLEV starts out as the number of levels (L), and is counted down at each level that a PME is extracted from a PM page. FIG. 5B illustrates circuitry for extracting the proper PME at a given level. More particularly, level indices 28(1), 28(2), and 28(3) are communicated as data inputs to a multiplexer network 80, the selection input of which is activated by the CURRLEV register so that the multiplexer output represents the index for the current level. This index is communicated to the select input of a multiplexer network 82 which receives as data inputs the PM page at the current level, and outputs the next lower PME. It should be noted that so long as the INSUFF signal is false, there is no need to perform any bounds check on the page map structure. Thus no arithmetic need be performed when doing any address calculation. Rather, the page map is guaranteed to have sufficient levels to reach the page allocated to the virtual address. At the same time, an address that is out of bounds (but still within the limits imposed by the number of levels of the page map), will be determined automatically by the fact that a PME at some level will indicate unallocatable.

In summary, it can be seen that the present invention provides a page mapping system which builds a data structure (the page map) that is no larger or more elaborate than is necessary to span and map the subspace. Allocation of physical pages within a given subspace size and expansion of the subspace occur with graceful changes in the page map structure.

While the above is a full and complete description of the preferred embodiment of the present invention, various modifications, alternate configurations, and equivalents may be employed without departing from the true spirit and scope of the present invention. For example, while the illustrative configuration showed page maps having no more levels than were required to span the subspaces in question, there is no fundamental reason why the page maps cannot have more levels than absolutely necessary. Additionally, there is no absolute requirement that the maximum number of PMEs placed within a PM page be the same for all levels. Indeed, in the illustrative embodiment, administrative limits (the overall address field size) limited the third level PM page to 8 PMEs (although the PM page was the regular size and had space for up to 256 PMEs, with PME(-8-255) indicating unallocable). Therefore, the above description and illustrations should not be taken as limiting the scope of the present invention which is defined by the appended claims.

Appendix 1—PME Formats

The page map entry (PME) is a generalized descriptor which describes a page in its current state. There are essentially two forms of the PME depending on whether the page is in memory or not. The Absence bit specifies the current form of the PME. Notice that the hardware only knows about the "in-memory" form of the PME. If the page is absent from memory the hardware only goes as far as invoking a memory fault after which the software memory manager takes over.

The following is an overview in Pascal notation of the information that must be kept in the PME. The actual details of the fields are to be determined by the memory manager.

The in-memory form of the PME (Absence bit=0) is:
PME=record
   absenceBit: bit {0 in this case};
   R: bit {Read access allowed if set};
   W: bit {Write access allowed if set};
   X: bit {Execute access allowed if set};
   COW: bit {Copy on write if set.}
   cacheability: bit {Defines cache management for this page
     0→Non-cacheable
     1→Cacheable};
   reference: bit {logically set when this page is referenced, cleared by the memory manager as appropriate};
   lowerLevelPageCount: 0..256 {This field only has meaning if this PME is in a second or third level page map, that is, if this PME points to a PM page of PMEs rather than to a page of data directly. This field counts the number of PMes (in the PM page described by this PME) that have their absence bits off (i.e. zero). If this entry points to an actual page of virtual space the count is 0. The memory manager will not page out this PM page of PMEs unless every PME in this PM page has a lower-level-page-count of 0};
   frameAddress: record {defined below, contains the physical address of the page being described};
end {in-memory PME}.

frameAddress=record
   busAddressEven: 0..31 {The address of the slot on the main bus to which the even numbered addresses of this page are mapped};
   busAddressOdd: 0..31 {The address of the slot on the main bus to which the odd numbered addresses of this page are mapped};
   physicalPageAddress: $0..2^{**}17-1$ {This is the address of the page within the controller specified by busAddressEven or busAddressOdd depending on the word (8 byte) address within that page.};
end {frameAddress}.

The out-of-memory form of the PME (absence bit=1) is:
PME=record
   absenceBit: bit {1 in this case};
   R: bit {Read access allowed if set};

W: bit {Write access allowed if set};
X: bit {Execute access allowed if set};
COW: bit {Copy on write if set.}
cacheability: bit {Defines cache management for this page.
0→Non-reachable
1→Cacheable};
}Menory Manager information relating to allocability and accessibility. Also includes the disk address in a format that permits the Memory Manager to find the page on disk.}
end {Out-of-memory PME}

We claim:

1. In the operation of a data processing system, a method of mapping physical pages to a particular virtual space capable of spanning at least V contiguous pages by use of a page map that is stored in a base address register and a number of page map pages where a given page map page may contain a maximum of P pointers, the metod coprising the steps of:

determining on the basis of P and V a minimum required number of level of the page map for the particular virtual space, designated 1, for which V is greater than $P^{l-1}$ and less than or equal to $P^l$;

selecting a number of page map levels, designated L, for which L is equal to or greater than l;

inserting a base address entry into the base address register;

inserting page map entries, which contain pointers to physical pages, into the page map pages to define a hierarchical page map structure having L paged levels, such levels being designated the first level through the L-th level, there being at least one page map page at each level and exactly one page map page at the L-th level;

the base address entry and the page map entries defining the page map, with the page map entries of the page map pages at the first level including pointers to the physical pages sought to be mapped, the page map entries of any higher level page map pages including pointers to the page map pages of the next lower level in the page map, and the base address entry including a pointer to the page map page at the L-th level;

placing in the page map an indicator of the number of levels L;

accessing a given physical page on the basis of the given physical page 's virtual address including the substeps of accessing the base address entry from the base address register, accessing a sequence of page map entries from a sequence of page map pages consisting of one page map page at each level, and determining whether or not the currently accessed page map entry is at the first level.

2. The method of claim 1 wherein said step of placing an indicator comprises the step of inserting a level descriptor representative of the number L in the base address entry in association with pointer to the page map page at the L-th level.

3. The method of claim 1 wherein said step of placing an indicator comprises the step of wetting a flag to a first state in all-of the page map entires except those in page map pages at the first level, and to a seocnd state in the page map pages at the first level in association with the pointers to the V physical pages to indicate that those pointers point directly to the physical pages.

4. In the operation of a data procesing system, a method of mapping physical pages to a particular virtual space capable of having allocated thereto a maximum of V pages by use of a page map that is stored in a base address register and a number of page map pages where a given page map page may contain a maximum of P pointers, the method comprising the steps of:

determining on the basis of P and V the minimum required number of levels of a page map for the particular virtual space, designated 1, for which $(P)^{l-1} < V \leq (P)^l$; selecting a number of page map levels, designated L, for which L is equal to or greater than 1, inserting a base address entry into the base address register;

inserting page map entries into the page map pages to define a hierachical page map structure having L paged levels wherein each physical page allocated to the particular virtual space is accessible via a sequence of pointers contained in page map entries in the page map, for each value of j for which $1 \leq j \leq L$, the j-th level of the page map has $n_j$ page map pages with $1 \leq n_j \leq P^{L-j}$, each physical page allocated to the particular virtual space has a pointer thereto contained in a page map entry in a designated one of the first-level page map pages, each first-level page map page which includes a pointer to a physical page allocated to the particular virtual space has a pointer to itself stored either as a page map entry in a designated one of the second-level page map pages if $L \geq 2$ or in the base address entry if $L = 1$, and if $L \geq 2$, each higher-level page map page which includes a pointer to a page map page at the next lower level has a pointer to itself stored as a page map entry in a designated one of the page map pages at the next higher level if there is a next higher level and in the base address entry if there is not next higher level;

placing in the page map a representation of the number of levels L;

accessing a given physical page on the basis of the given physical page's virtual address including the substeps of accessing the base address entry from the base address register, accessing a sequence of page map entries from a sequence of page map pages consisting of one page map page at each level, and determining whether or not the currently accessed page map entry is at the first level.

5. A digital computer system having a central processor unit, a memory subsystem that includes at leat one memory unit, a disk subsystem that includes at least one disk drive, and an I/O subsystem coupled to the memory subsystem and the disk subsystem, the computer system having a virtual addressing capability, wherein:

the memory subsystem defines a real memory space that consists of a plurality of real memory pages;

each real memory page is characterized by a real memory address corresponding to the physical location of that real memory page in the real memory space;

the disk subsystem defines a disk space that consists of a plurality of disk pages;

each disk page is characterized by a physical disk address corresponding to the physical location of that disk page in the disk space;

the I/O subsystem is operable to copy any disk page into the memory space and any memory page into the disk space;

the real memory pages and the disk pages are collectively referred to as actual pages, and the addresses of such actual pages are referred to as actual page locations;

at least some instructions executable by the central processing unit have virtual address operands that refer to a virtual space that is organized as a plurality of virtual pages;

each virtual page is characterizxed by a virtual address, with the virtual addresses spanning a range that includes a starting address at one end of the range;

the computer system includes means for allocating actual pages, referred to as allocated actual pages, to at least some of the virtual pages;

the virtual pages to which actual pages are allocated define a set of virtual addresses which includes a most remote virtual address, namely the virtual address in the set that differs the most from the starting address, the most remote virtual address and the starting address thereby defining the extremes of a range of V contiguous virtual addresses;

the computer system includes means for constructing a page map associated with the virtual space, the page map being stored in a base address register and a number of actual pages, referred to as page map pages, each page map page being sized to contain a maximum of P page map entries, called PME's, the base address register containing a base address entry;

the base address entry and each PME are sized to include a pointer specifying an actual page location;

the relationship of the pointers in the base address entry and PME's defines a hierarchical page map structure, which has L levels, where $L \geq 1$ and satisfies $P^L \geq V$;

the first level contains a number of page map pages, the PME's of which include pointers specifying the actual page locations of the allocated actual pages;

if $L > 1$, each level other than the first level contains a number of page map pages, the PME's of which include pointer specifying the actual page locations of the page map pages at the next lower level;

the L-th level contains one page map page;

the base address entry contains a pointer specifying the actual page location of the page map page at the L-th level;

the constructing means further includes means for placing in the page map an indicator of the number of levels L; and the computer system further includes means, responsive to the virtual address operands, for determining the actual page locations of actual allocated pages, including means for successively accessing the base entry from the base address register and a sequence of PME's from a sequence of page map pages consisting of one page map page at each level, and means, responsive to the indicator, for determining whether or not the currently accessed PME is at the first level.

6. The computer system of claim 5 wherein the indicator is a level descriptor representative of the number L stored in the baes address register in association with the pointer to the page map page at the L-th level.

7. The computer system of claim 5 wherein the indicator is a flag stored in all of the page map pages, the flag being set only in the page map pages at the first level to indicate that a PME in such a page map page contains a pointer to an actual allocated page rather than to a page map page at a lower level.

8. A digital computer system having a central processor unit, a memory subsystem that includes at least one memory unit, a disk subsystem that includes at least one disk drive, and an I/O subsystem coupled to the memory subsystem and the disk subsystem, the computer system having a virtual addressing capability, wherein:

the memory subsystem defines a real memory space that consists of a plurality of real memory pages;

each real memory page is characterized by a real memory address corresponding to the physical location of that real memory page in the real memory space;

the disk subsystem defines a disk space that consists of a plurality of disk pages;

each disk page is characterized by a physical disk address corresponding to the physical location of that disk page in the disk space;

the I/O subsystem is operable to copy any disk page into the memory space and any memory page into the disk space;

the real memory pages and the disk pages are collectively referred to as actual pages, and the addresses of such actual pages are referred to as actual page locations;

at least some instructions executable by the central processing unit have virtual address operands that refer to a virtual space that is organized as a plurality of virtual pages;

each virtual page is characterized by a virtual address, with the virtual addresses spanning a range that includes a starting address at one end of the range;

the computer system inclds means for allocating actual pages, referred to as allocated actual pages, to at least some of the virtual pages;

the virtual pages to which actual pages are allocated defined a set of virtual address which includes a most remote virtual address, namely the virtual address in the set that differs the most from the starting address, the most remote virtual address and the starting address thereby defining the extremes of a range of V contiguous virtual addresses;

the computer system includes means for constructing a page map associated with the virtual space, the page map being stored in a base address register and a number of actual pages, referred to as page map pages, each page map page being sized to contain a maximum of P page map entries, the base address register containing a base address entry;

each actual allocated page is accessible via a sequence of pointers contained in page map entries in the page map;

the base address entry and page map entries define a hierarchical page map structure having L paged levels where $L \geq 1$ and satisfies $P^L \geq V$;

for each value of j for which $1 \leq j \leq L$, the J-th level of the page map has $n_j$ page map pages with $1 \leq n_j \leq P^{L-j}$;

each actual allocated page has a pointer thereto contained in a page map entry in a designated one of the first-level page map pages;

each first-level page map page which includes a pointer to an actual allocated page has a pointer to itself contained either in a page map entry in a designated one of the second-level page map pages if $L \geq 2$ or in the base address register if $L=1$;

if $L \geq 2$, each higher-level page map page which includes a pointer to a page map page at the next lower level has a pointer to itself contained either in a page map entry in a designated one of the page map pages at the next higher level if there is a next higher level or in the base address entry if there is no next higher level;

the constructing means further includes means for placing in the page map an indicator of the number of levels L;

the computer system further includes means, responsive to the virtual address operands, for determining the actual page locations of actual allocated pages, including means for successively accessing the base entry from the base address register and a sequence of a page map entries from a sequence of page map pages consisting of one page map page at each level, and means, responsive to the indicator, for determining whether or not the currently accessed page map entries is at the first level.

9. The computer system of claim 8 wherein the indicator is a level descriptor representative of the number L stored in the base address register in association with the pointer to the page map page at the L-th level.

10. The computer system of claim 8 wherein the indicator is a flag stored in all of the page map pages, the flag being set only in the page map pages at the first level to indicate that a page map entry in such a page map page contains a pointer to an actual allocated page rather than to a page map page at a lower level.

* * * * *